US008910860B2

(12) United States Patent
Fitzsimmons (10) Patent No.: US 8,910,860 B2
(45) Date of Patent: Dec. 16, 2014

(54) SYSTEMS AND METHOD FOR PROVIDING INFORMATION TO A RECIPIENT OF A PHYSICAL MAIL OBJECT

(71) Applicant: Todd E Fitzsimmons, Long Beach, CA (US)

(72) Inventor: Todd E Fitzsimmons, Long Beach, CA (US)

(*) Notice: Subject to any disclaimer, the term of this patent is extended or adjusted under 35 U.S.C. 154(b) by 0 days.

(21) Appl. No.: 13/848,370

(22) Filed: Mar. 21, 2013

(65) Prior Publication Data
US 2014/0291388 A1    Oct. 2, 2014

Related U.S. Application Data

(63) Continuation of application No. 13/560,306, filed on Jul. 27, 2012, now Pat. No. 8,429,093, which is a continuation of application No. 13/297,515, filed on Nov. 16, 2011, now Pat. No. 8,260,629, which is a continuation of application No. 12/454,052, filed on May 11, 2009, now Pat. No. 8,073,787, which is a continuation of application No. 10/271,471, filed on Oct. 15, 2002, now Pat. No. 7,818,268.

(60) Provisional application No. 60/330,031, filed on Oct. 16, 2001.

(51) Int. Cl.
*G06F 17/00* (2006.01)
*G06Q 10/08* (2012.01)

(52) U.S. Cl.
CPC ................... *G06Q 10/0832* (2013.01)
USPC ........... 235/375; 235/487; 705/402; 705/408; 705/1.1

(58) Field of Classification Search
CPC ...... G06K 15/00; G06K 15/007; G06F 17/00; G06F 17/21; G06F 17/243; G06Q 20/382; G06Q 20/389; G06Q 30/04; G06Q 30/06; G06Q 30/08

USPC ............ 235/375, 487, 462.01; 705/401–402, 705/408, 1.1, 64

See application file for complete search history.

(56) References Cited

U.S. PATENT DOCUMENTS

| 4,725,718 A | 2/1988 | Sansone et al. |
| 5,153,842 A | 10/1992 | Dlugos, Sr. et al. |

(Continued)

FOREIGN PATENT DOCUMENTS

| EP | 0 741 376 | 6/1996 |
| EP | 0 787 334 B1 | 5/1998 |

(Continued)

OTHER PUBLICATIONS

James L. Cambier and Clyde Musgrave; Printable, Scannable Biometric Template for Secure Documents and Materials; pp. 162-166 of Optical Security and Counterfeit Deterrence Techniques III, vol. 3973, Jan. 27-28, 2000, Proceedings of SPIE.

(Continued)

*Primary Examiner* — Edwyn Labaze
(74) *Attorney, Agent, or Firm* — Todd Fitzsimmons (57) ABSTRACT

A system and method is provided for transmitting information over a wide area network, such as the Internet, in response to receiving at least a portion of mail data. In one embodiment of the present invention, information is stored in a memory. Mail data is then affixed to a mail object. The mail object is then manually delivered to a recipient. The mail data is then provided to a reception device. The reception device then uses the mail data to retrieve the information from a mail device in communication with the memory. In a preferred embodiment, the mail data includes data corresponding to the recipient of the mail object, and the information includes data on a content of the mail object (e.g., data that is included inside an envelope portion of the mail object).

30 Claims, 3 Drawing Sheets

(56) References Cited

U.S. PATENT DOCUMENTS

| | | | |
|---|---|---|---|
| 5,805,810 | A | 9/1998 | Maxwell |
| 5,812,991 | A | 9/1998 | Kara |
| 5,917,925 | A | 6/1999 | Moore |
| 5,930,796 | A | 7/1999 | Pierce et al. |
| 6,005,945 | A | 12/1999 | Whitehouse |
| 6,081,827 | A | 6/2000 | Reber et al. |
| 6,101,320 | A | 8/2000 | Schuetze et al. |
| 6,101,487 | A | 8/2000 | Yeung |
| 6,539,360 | B1 | 3/2003 | Kadaba |
| 6,687,684 | B1 | 2/2004 | Whitehouse et al. |
| 6,826,548 | B2 | 11/2004 | Hungerpiller et al. |
| 6,993,491 | B2 | 1/2006 | Sansone |
| 7,058,610 | B1 | 6/2006 | Pintsov |
| 7,225,170 | B1 | 5/2007 | Ryan, Jr. et al. |
| 7,386,457 | B2 | 6/2008 | Sansone |
| 7,756,795 | B2 | 7/2010 | Ryan, Jr. et al. |
| 8,108,223 | B2 | 1/2012 | Willoughby |
| 8,170,959 | B2 | 5/2012 | Willoughby et al. |
| 8,255,235 | B2 | 8/2012 | Aldstadt |
| 2010/0100944 | A1 | 4/2010 | Fleming, III |
| 2010/0292833 | A1* | 11/2010 | Gorp et al. .................. 700/221 |
| 2012/0066153 | A1* | 3/2012 | Whitehouse ............... 705/407 |
| 2013/0198300 | A1* | 8/2013 | Briggman et al. .......... 709/206 |

FOREIGN PATENT DOCUMENTS

| | | |
|---|---|---|
| WO | WO 01/35348 | 5/2001 |
| WO | WO 0135348 A1 * | 5/2001 |

OTHER PUBLICATIONS

Brian Fonseca; USPS Delivers Digital, Signature-Certified Mail System; p. 44 of InfoWorld, vol. 23, Issue 11, Mar. 12, 2001.

United States Postal Service; Planet PostaL Alpha-Numeric Encoding Technique; 1994.

United States Postal Service; Universal Coding Strategy; Information Platform Processing & Distribution; Jul. 29, 2000.

Joe Lubenow; Alternatives for Mail Tracking Using Mailpiece and Container Barcodes; GCA Addressing/Distribution Summer Conference; Jul. 29, 1998.

United States Postal Service; Customer Service Guide to Confirm Using Planet Code; United States Postal Service, Core Business Marketing.

United States Postal Service; Customer Service Guide to Confirm Services Using Planet Code Barcodes; Oct. 2001.

Don Archer; The Check Is In The Mail; pp. 20-21 of Mailing Systems Technology; Sep.-Oct. 1998.

United States Postal Service; Confirm—Product Definition Summary; Confirm Development Progress.

United States Postal Service; Destination—Confirm Description.

MTAC Workgroup; Confirm With Planet Code; Meeting Minutes for Apr. 20, 1999.

Joe Lubenow; MTAC and the USPS Information Platform; Experian, Direct Tech, Feb. 12, 1999.

Mail Poste, Canada Post Corporation; Canada Post's 4-State Bar Code Handbook; Aug. 1997.

United States Postal Service; Proposed Changes To The Domestic Mail Manual To Implement Docket No. R2000-1; pp. 52480-52585 of Federal Register, vol. 65, No. 168; Aug. 29, 2000.

United States Postal Service; Production, Distribution, and Use of Postal Security Device an Information-Based Indicia; pp. 58682-58698 of Federal Register, vol. 65, No. 191, Oct. 2, 2000.

United States Postal Service; Changes to the Domestic Mail Manual to Implement Docket No. R2000-1; pp. 78538-78654 of Federal Register, vol. 65, No. 242; Dec. 15, 2000.

United States Postal Service; Postage Evidencing Product Submission Procedures; pp. 20211-20218 of Federal Register, vol. 65, No. 73; Apr. 14, 2000.

United States Postal Service; Specifications for Postal Security Devices and Indicia (Postmarks), pp. 34460-34461 of Federal Register, vol. 61, No. 128; Jul. 2, 1996.

United States Postal Service; Information Based Indicia Program (IBIP), p. 44094 of Federal Register, vol. 61, No. 167; Aug. 27, 1996.

United States Postal Service; Information Based Indicia Program, p. 53468 of Federal Register, vol. 61, No. 199; Oct. 11, 1996.

United States Postal Service; Specifications for Information Based Indicia Program "Host Systems," pp. 55676-55677 of Federal Register, vol. 61, No. 209; Oct. 28, 1996.

United States Postal Service; Specifications for Information Based Indicia Program "Host Systems"; Correction, pp. 1001-1004 of Federal Register, vol. 62, No. 4; Jan. 7, 1997.

United States Postal Service; Manufacture, Distribution, and Use of Postal Security Devices and Information Based Indicia, pp. 14833-14843 of Federal Register, vol. 62, No. 60; Mar. 28, 1997.

United States Postal Service; Specifications for Information Based Indicia Program "Key Management Plan," p. 37631 of Federal Register, vol. 62, No. 134; Jul. 14, 1997.

United States Postal Service; Specifications for Information Based Indicia Program (IBIP) Postal Security Device and Indicia (Postmarks), pp. 45471-45473 of Federal Register, vol. 62, No. 166; Aug. 27, 1997.

United States Postal Service; Information Based Indicia Program (IBIP), p. 7190 of Federal Register, vol. 63, No. 29; Feb. 12, 1998.

United States Postal Service; Information Based Indicia Program (IBIP), p. 10419 of Federal Register, vol. 63, No. 41; Mar. 3, 1998.

United States Postal Service; Information Based Indicia Program (IBIP), pp. 39303 of Federal Register, vol. 63, No. 140; Jul. 22, 1998.

United States Postal Service; Information Based Indicia Program (IBIP) Performance Criteria for Information Based Indicia and Security Architecture for IBI Postage Metering Systems (PCIBISAIBIPMS), p. 45535 of Federal Register, vol. 63, No. 165; Aug. 26, 1998.

United States Postal Service; Manufacture, Distribution, and Use of Postal Security Devices and Information-Based Indicia, pp. 46719-46728 of Federal Register, vol. 63, No. 170; Sep. 2, 1998.

United States Postal Service; Metering Product Submission Procedures, pp. 46728-46732 of Federal Register, vol. 63, No. 170; Sep. 2, 1998.

United States Postal Service; Information Based Indicia Program (IBIP) Product Definition, p. 10419 of Federal Register, vol. 63, No. 41; Mar. 3, 1998.

United States Postal Service; Information-Based Indicia Program (IBIP) Performance Criteria for Information-Based Indicia and Security Architecture for Closed IBI Postage Metering Systems (PCIBI-C), p. 4728 of Federal Register, vol. 64, No. 19; Jan. 29, 1999.

United States Postal Service; Information-Based Indicia Program (IBIP) Performance Criteria for Information-Based Indicia and Security Architecture for Open IBI Postage Evidencing Systems (PCIBI-O), p. 38225 of Federal Register, vol. 64, No. 135; Jul. 15, 1999.

United States Postal Service; Postage Evidencing Product Submission Procedures, pp. 44760-44766 of Federal Register, vol. 64, No. 158; Aug. 17, 1999.

United States Postal Service; Information-Based Indicia Program (IBIP) Performance Criteria for Information-Based Indicia and Security Architecture for Closed IBI Postage Metering Systems (PCIBI-C); Jan. 12, 1999.

United States Postal Service; Information-Based Indicia Program (IBIP) Performance Criteria for Information-Based Indicia and Security Architecture for Open IBI Postage Evidencing Systems (PCIBI-O); Feb. 23, 2000.

Bob Rosser; Experian Letter to USPS.

Experian; Planet Code Processing Options—Company Confidential; Jan. 22, 1999.

United States Postal Service; Confirm National Postal Forum Business Session Presentation Slides.

United States Postal Service; Confirm at www.planetcodes.com.

United States Postal Service; Untitled Web Pages for Planet Codes.

United States Postal Service; GCA Talking Points; Jul. 28, 1999.

MTAC; MTAC Information-Rich Mailpiece Barcode Workgroup; Meeting Minutes; Oct. 7, 1998.

Joe Lubenow; Information Rich Mailpiece Barcode Meeting—Agenda; Jul. 12, 1999.

Joe Lubenow; Experian Letter to USPS; Jul. 13, 1999.

Joe Lubenow; Experian Letter to USPS; Jun. 30, 1999.

(56) References Cited

OTHER PUBLICATIONS

Joe Lubenow, A Barcode Fit For The Information Age; pp. 54-55 of Mail: The Journal of Communication Distribution; Oct. 1998.
Graphic Communications Association; Draft Proposed GCA Standard 120-1991, Bar/Half-Bar Symbology for Destination Coding of Letter and Flat Mail Pieces; 1991.
Kathleen Siviter, Mailers Bristle at Fee on Tracking Customers Say Proposed System Will Improve Service; Federal Times; Mar. 8, 1999.
United States Postal Service; Planet Code USPS.
Cameron Bellamy; Planet Code Update; Spring 1999.
Bob Rosser; Experian Consumer Credit Reports "From Print to Mail and Back via Planet Codes": A Case Study; MailCom Conference; Apr. 15, 1999.
MTAC; Confirm/Planet Codes—MTAC & User Group Meeting Agenda; Apr. 20, 1999.
Cug; Confirm User Group Meeting Agenda; Apr. 20, 1999.
MTAC; MTAC Meeting Minutes; Jan. 19, 1999.
Joe Lubenow; Progress Report and Announcement of First Meeting; Sep. 9, 1998.
Bill Shuff and David Humphries; Let it snow, let it snow, let it snow; Postal Technology; 1999.
United States Postal Service; Confirm Offers Mailers Information Before the Mail Arrives.
United States Postal Service; USPS Letter to Experian; Feb. 25, 1999.
Joe Lubenow; Experian Letter to USPS; Mar. 18, 1999.
United States Postal Service, Address Management National Customer Support Center; Move Update Compliance Review Team.
MTAC; Postmaster General's Mailers Technical Advisory Committee 1998 Annual Report; 1998.
Joe Lubenow; MTAC and the USPS Information Platform; Feb. 12, 1999.
Paul Mathans, Brad Stamp and Craig Harmon; A White Paper on Two Dimensional Symbols Because You Need Information on the Fly and on the Spot; 1996.
Australia Post; Various Web Pages From www.aupost.com; Jun. 21, 1999.
Australia Post; Barcoding Technical Specification; Jun. 1998.
Australia Post; Printing the 4-State Barcode; Jun. 1998.
Experian; Experian Postal Information Network Plus Precision Electronic Tracking Tools for Marketers.
Canada Post; 4-State Bar Code Font Development and Verification Procedures; Aug. 1996.
Joe Lubenow; USPS Service Performance Tracking Using Mailpiece and Container Barcodes; 1998 AMMA Postal Policies and Operations Conference; Jun. 3, 1998.
Cug; Confirm Users Group Data Sharing Committee; Oct. 3, 2000.
Bob Rosser; Destination Confirm Experian Credit Report Test; Jan. 19, 1999.
United States Postal Service; Customer Service Guide to Confirm Service Using Planet Code Barcodes, Oct. 2001.
Bob Rosser; Experian Letter to USPS; May 14, 1999.
United States Postal Service; Confirm Development Progress.
United States Postal Service; Confirm Application.
United States Postal Service; Customer Guide to Confirm Using Planet Codes.
United States Postal Service; Planet PostaL Alpha-Numeric Encoding Technique; Nov. 28, 1995.
Paul Bakshi; Confirm/Planet Codes MTAC Sessions; Jul. 16, 1999.
MTAC; MTAC Mail Tracking/Planet Code Workgroup Agenda; Aug. 4, 1999.
United States Postal Service; Confirm/Planet Code.
MTAC; MTAC Workgroup Confirm With Planet Code Meeting Minutes; Apr. 20, 1999.
United States Postal Service; Destination-Confirm Description.
MTAC; MTAC Workgroup Information Rich Barcodes Agenda; Aug. 5, 1999.
United States Postal Service; Priority Mail United States Postal Service Delivery Confirmation Technical Guide, Version 1.3; Oct. 1997.
Joe Lubenow; Unit Load Tracking Using the Planet Code; Oct. 1998.
United States Postal Service; United States Postal Service Delivery Confirmation Addendum to Technical Guide, Version 1.33; May 1998.
Outlook 1999; Mail: The Journal of Communication Distribution; Dec. 1998-Jan. 1999.
Cobblestone Software, Inc.; Why Digital Information on Paper? The Case for PaperDisk; 1996.
Joe Lubenow; Update on Mailpiece Barcodes; Sep. 9, 1998.
MTAC; The Report of the MTAC Capital Spending Work Group.
Joe Lubenow; USPS Service Performance Tracking Using Mailpiece and Container Barcodes; Nov. 18, 1998.
Joe Lubernow; Experian Letter to USPS; Dec. 22, 1998.
MTAC; MTAC Mail Tracking Workgroup; Meeting Minutes; Jul. 23, 1998.
United States Postal Service; Mail Piece Tracking—Confirm.
MTAC, MTAC Mail Tracking Information Workgroup, Meeting Minutes; Sep. 15, 1998.
Joe Lubenow; Planet Code for Flats: Reasons to Proceed; Aug. 29, 1998.
JoeLubenow; Untitled Communication; Sep. 23, 1999.
Don Archer; The Check is in the Mail Planet Codes—what they are, and how they work; Mailing Systems Technologies; Sep.-Oct. 1998.
Mike Stephens; HyperPres Letter to Experian; Nov. 25, 1998.
Royal Mail; Mailsort User's Guide; 1996.
MTAC; MTAC Workgroup Information Rich Barcode; Meeting Minutes; Aug. 5, 1999.
Joe Lubenow; Information Components for Postal Addressing and Mail Tracking; World Conference on Direct Mail; Aug. 24, 1999.
Joe Lubenow; A Barcode Fit for the Information Age; pp. 53-54 of Mail: The Journal of Communication Distribution; Oct. 1998.
Experian; ePIN+—Precision Electronic Tracking Tool for Marketers; Apr. 8, Rev 1.
MTAC; MTAC Work Group Meeting Planet Code/Information Rich Barcode; Agenda; Sep. 7, 1998.
Data Collector Servers Summary Report; Jan. 14, 1999.
MTAC; MTAC Tracking (Confirm/Planet Code) Workgroup; Agenda; Jan. 19, 1999.
Paul Bakshi; Planet Code; Jan. 19, 1999.
Joe Lubernow; Untitled Communication; October4 26, 1998.
Glenn Davis; USPS Proposal to Experian; Oct. 22, 1998.
Customer Tracking Using the Planet Code; Oct. 15, 1998.
United States Postal Service; Information Based Indicia Program (IBIP) Technology Symposium; Proceedings; Nov. 25-26, 1996.
Joe Lubendow; Value Added Services Through the IBIP Mailers Survey.
Joe Lubendow; Metromail Fax to USPS; Oct. 13, 1997.
IBIP; Jul. 19, 1996.
MTAC; IBIP Subcommittee Meeting; Meeting Report; Jul. 31, 1997.
United States Postal Service; Information-Based Indicia Program; Meter Technology Management; Jul. 22, 1997.
I0S; MTAC IBIP Workgroup Report; Aug. 15, 1997.
MTAC; IBIP MTAC Workgroup Meeting Notes; Jul. 31, 1997.
Paul Nurn; Symbology and Scanning of the IBI; Nov. 26, 1996.
IBIP; Oct. 27, 1997.
MTAC; MTAC IBIP Workgroup Meeting 3; Proposed Agenda; Oct. 27, 1997.
United States Postal Service; What is Information Based Indicia? .
Industry Questions Regarding the Digital Encription Requirement.
United States Postal Service; Specifications for Information Based Indicia Program "Host Systems"; pp. 55676-55677 of Federal Register; vol. 91, No. 209; Oct. 28, 1996.
Richard Pavely; Waiting for PC-Based Postage; Office Systems; Feb. 1998.
United States Postal Service; Information Based Indicia Program (IBIP); Questions & Answer.
MTAC IBIP; Mar. 8, 1998.
MTAC; MTAC IBIP Workgroup; Oct. 17, 1997.
MTAC; MTAC IBIP Workgroup Committee; First and Second Meeting; Jul. 31 and Sep. 7, 1997.
Metromail; MTAC IBIP Workgroup.
MTAC IBIP Workgroup; Sep. 7, 1997.
United States Postal Service; USPS Letter to Joe Lubenow; Oct. 10, 1997.

(56) References Cited

OTHER PUBLICATIONS

United States Postal Service; IBIP Public Meeting; Inquiry Documentation; Sep. 25, 1996.
United States Postal Service; Information Based Indicia Program Postal Security Device Specification; Jun. 13, 1996.
United States Postal Service; Draft 39 CFR Part Section 502 Manufacture, Distribution, and Use of Products/Devices; Sep. 23, 1996.
United States Postal Service; Postage Payment Product/Device Policy and Regulations; Public Working Session; Sep. 25, 1996.
List of Attendees; Sep. 25, 1996.
United States Postal Service; Draft Domestic Mail Manual—P050; Sep. 19, 1996.
FIM D Used for Information Based Indicia Program With POSTNET Barcode.
References and Resources Information Sheet.
MTAC; Mailers' Technical Advisory Committee Engineering and Technology/Transportation Subcommittee.
Robert Lindsay; Postal Operations Committee Letter to USPS; Nov. 8, 1996.
Wayne Wilkerson; Retail Systems and Equipment Letter to USPS; Nov. 12, 1996.
IBIP Test Mail.
IBIP '98 Update; Proposed Agenda; Mar. 12, 1998.
United States Postal Service; Information Based Indicia Program Technical Specification; Public Meeting; Jul. 19, 1996.
United States Postal Service; Information Based Indicia Program Technical Specification; Public Meeting; Jan. 31, 1997.
United States Postal Service; Information Based Indicia Program Host System Specification (Draft); Oct. 9, 1996.
Paul Quinn; DF417 Makes its Case Wine Distributor taps 2-D symbology to combine shipping, licensing, and tax data; pp. 26-28 of IDSystems; Sep. 1996.
James Manji; 2-D Bar Codes Prove Smaller is Better; pp. 46-49 of Managing Automation; Jul. 1996.
MTAC; IBIP; MTAC Work Group Report.
United States Postal Service; Attendees—IBIP Public Meeting; Jul. 19, 1996.
United States Postal Service; Postal Service Seeks Input on a New Form of Postage; Jul. 5, 1996.
MTAC; MTAC IBIP Workgroup; Nov. 24, 1997.
Wayne Wilkerson; Retail Systems and Equipment Letter to USPS; Jan. 3, 1997.
USPS Jul. 19 IBIP Public Meeting; Jul. 19, 1996.
AMMA; Advertising Mail Marketing Association Bulletin 54-96; Nov. 22, 1996.
MTAC; MTAC IBIP Workgroup; Oct. 27, 1997.
United States Postal Service; Information Based Indicia Program (IBIP) Indicium Specification; Jun. 13, 1996.
IOS; MTAC IBIP Workgroup Report; Aug. 15, 1997.
MTAC; Information Based Indicia Program (IBIP) Overview; Mailer's Technical Advisory Committee (MTAC); Sep. 11, 1996.
Experian; Information Platform Pilot for Automated Letter Mail; Scope of Pilot Project with Experian.
United States Postal Service; Address Element Correction Technical Guide; Oct. 1998.
E-Stamps; E-Stamps Corporation Brings Digital Stamps to PCs Via the Internet; May 5, 1997.
E-Stamps; E-Stamps Internet Postage First Solution Approved for Beta Testing by U.S. Postal Service; Mar. 31, 1998.
E-Stamps; E-Stamps Receives National Approval from U.S. Postal Service; Aug. 9, 1999.
The E-Stamp Team.
Experian.
Specimen Concept Sample.
United States Postal Service; Presenting the National Postal Forum Technology Track; Technical Presentations and Discussions; Chicago National Postal Forum 1999.
United States Postal Service; Address Element Correction Technical Guide; May 1998.

United States Postal Service; Fighting Mail Order Fraud and Theft Best Practices for the Mail Order Industry; Jan. 1999.
MTAC; Seizing Opportunity the Report of the 2001 Mailing Industry Task Force; Oct. 15, 2001.
Firstlogic/AND partnership connects you to global marketplace; First Connection A Firstlogic New Source.
Next level of address quality on the horizon; Postal World; Sep. 2, 2002.
United States Postal Service; Postal Addressing Standards, Publication 28; Jan. 1992.
United States Postal Service; Glossary of Postal Terms; Apr. 1988.
United States Postal Service; Barcode Update; Sep. 1991.
SmartMail Services; SmartMail didn't invent drop shipping . . . we perfected it!
Joshua Smith; Defended by the Dragon; Post-Express; Sep. 8, 1999.
United States Postal Service; Mailers Companion; Special Handout; Jun. 1999.
United States Postal Service; Information Platform Program Plan Version 1.1; Jun. 2, 2000.
Joe Lubenow; Addressing Issues; GCA Addressing/Distribution Conference; Apr. 12-14, 2000.
Charles Bravo; Information Platform.
Bob Rosser; Planet Code/Confirm Technology Capabilities A Mailer's Perspective; Apr. 13, 2000.
The Information Platform; GCA 2000 Addressing/Distribution Spring Conference; Apr. 13, 2000.
Speaker Bios Addendum; Addressing Distribution Spring Conference, Clearwater Beach, Florida; Apr. 11-14, 2000.
United States Postal Service; Mailpiece and Unit Load Tracking Positive Control of the Mail Flow.
Joe Lubenow; Universal Coding Strategy and the USPS Information Platform; National Postal Forum; Mar. 27, 2001.
United States Postal Service; Information Platform Pallet and Bundle Tracking Pilot; Information Platform Processing & Distribution; Aug. 20, 2001.
United States Postal Serivce; Information Platform Universal Coding Strategy; Information Platform Processing & Distribution; Aug. 20, 2001.
MTAC; MTAC Unit Load Tracking/Information Rich Barcode Subcommittee; Aug. 20, 2001.
Unit Load Tracking; Aug. 20, 2001.
MTAC; MTAC Unite Load Tracking Subcommittee; Jun. 20, 2000.
United States Postal Service; USPS Gets Smart With New Mail Tracking System; Jan. 5, 2000.
United States Postal Service; Information Platform Universal Coding Strategy; Information Platform Processing & Distribution; Jun. 29, 2000.
Joe Lubenow; Information Platform Benefits for Mailers; Jul. 20, 2000.
MTAC; Summary of MTAC Unit Load Tracking Subcommittee Meeting; William F. Bolger Center, Potomac, MD; Jun. 29, 2000.
Universal Coding Strategy; Mar. 23, 2001.
Watt Bryan; 20 Questions to Consider in Developing a Universal Coding Strategy; National Postal Forum Business Session; Mar. 27, 2001.
United States Postal Service; Undeliverable As Addressed; Sep. 1999.
Metronet; Metromail's Online Information Service.
United States Postal Service; Transaction 2000; Mailing Systems Development.
United States Postal Service; Barcode Quality.
National Institute of Federal Procurement; USPS Capital Investment Plan FY 1994-2000; 1996.
United States Postal Service; Address Correction Information; pp. 15056-15066 of Federal Register, vol. 62, No. 60; Mar. 28, 1997.
Doug Henschen; Service Bureaus Push Electronic List Transmittal; p. 23 of DMNews, vol. 19, No. 44; Apr. 14, 1997.
Michael Murphy; USPS Letter to Postal Customers; Apr. 8, 1997.
Article Re: High-Rise Apartments in New York City.
Daryl Hamilton; 24-Digit Tray Barcode Consolidates Information and Increases Efficiency; Mailers Companion; May 2000.
Joe Schick; Information Technology Summit; Sep. 8, 1999.

(56) References Cited

OTHER PUBLICATIONS

United States Postal Service; USPS Information Platform; Joint MTAC/USPS Meeting.
Joe Lubenow; Enhancing Mail's Value as a Business Communications Medium; National Postal Forum; May 17, 1999.
AMMA; Resolution of the Advertising Mail Marketing Association (AMMA) on the Postal Information Platform.
Joe Lubenow; An Industry Perspective on the USPS Information Platform; National Postal Forum; Sep. 28, 1999.
United States General Accounting Office; U.S. Postal Service Development and Inventory of New Products; Report to the Chairman, Subcommittee on the Postal Service, Committee on Government Reform and Oversight House of Representatives; Nov. 1998.
United States Postal Service; Production, Distribution, and Use of Postal Security Devices and Information-Based Indicia; pp. 58682-58698 of Federal Register, vol. 65, No. 191; Oct. 2, 2000.
ANSI MH10/SC 8; Transfer Syntax for High Capacity ADC Media; Aug. 21, 1998.
ANSI MH10.8.3M-1996; Unit Loads and Transport Packages—Two-Dimensional Symbols; Jul. 15, 1996.
J.D. Tygar et al.; Cryptographic Postages Indicia; Carnegie Mellon University Computer Science Technical Reports CMU-CS-96-113; Jan. 1996.
J.D. Tygar et al.; Cryptographic Postage Indicia; pp. 378-391 of in Concurrency and Parallelism, Programming Networking, and Security, eds. J. Jaffar adn R. Yap Springer; 1996.
J.D. Tygar et al.; Cryptographic Postage Indicia; pp. 378-391 of Final Version in Concurrency and Parallelism, Programming Networking, and Security, eds. J. Jaffar adn R. Yap Springer; 1996.
Jose Pastor; Cryptopost a Universal Information Based Franking System for Automated Mail Processing; pp. 429-442 of Crypto Advanced Technology Conference, vol. One; Nov. 5-7, 1990.
RPS; Multicode Bar Code Label Guide.
Bennet Yee et al.; Secure Coprocessors in Electronic Commerce Applications; pp. 155-170 of In Proceedings of the 1st Usenix Workshop on Electronic Commerce; Jul. 1995.
UPS; Guide to Bar Coding with UPS for Customer Generating Bar Code Labels, Version III.
Bennet Yee; Using Secure Coprocessors; School of Computer Science Carnegie Mellon University; May 1994.
Stuart Willoughby; System and Methods for Application Programming Interfaces for Shipping Services; Aug. 25, 2000.
Stuart Willoughby; Method for Automated Access to Shipping Services; Sep. 7, 2000.
Mark Lewis; UPS Letter to Shipping System Provider.
ANSI; Unit Loads and Transport Packages—Two-Dimensional Symbols; Jul. 15, 1996.
ANSI; Unit Loads and Transport Packages—Bar Code Symbols; 1994.
UPS; Guide to Bar Coding with UPS for Customers Generating Bar Code Labels, Canadian Version 1.01.
UPS; Guide to Bar Coding with UPS for Customers Generating Bar Code Labels, Supplement to Version 1; Jan. 4, 1993.
UPS; Guide to Bar Coding with UPS for Customers Generating Bar Code Labels, Version II; Mar. 1, 1994.
UPS; Guide to Bar Coding with UPS for Customers Generating Bar Code Labels, Version III; 1996.
UPS; Guide to Bar Coding with UPS for Customers Generating Bar Code Labels, Version IV; 1997.
UPS; Guide to Bar Coding with UPS for Customers Generating Bar Code Labels, Version V; 1998.
ATA; Motor Carrier Industry Implementation Guide for Standard Data Formats Using Bar Codes in Transportation; American Trucking Associations Information Technology & Logistic Council; 1998.
RPS; RPS Multicode Bar Code Label Guide; 1999.
Inside Case Coding; The Insider; Jan. 1997.
Amy Santucci; ANSI Adopts 2D Shipping Label Standard, Should You?; The Insider; Jan. 1997.
Summit Information Systems, Inc.; Automated Freight Handling Setup Guide; Jan. 1994.
The Future of Bar Code; The Scanner.
RPS; Multicode; Sep. 19, 1999.
Ed DiSalvo; RPS Letter to RPS National Account; Dec. 1994.
Amy Santucci; RPS Letter to Book Industry Study Group; Mar. 21, 1995.
RPS; Roadway Package System Announces Development of Multicodes; Nov. 15, 1994.
RPS; Multicode.
Multicode Makeovers; newsPAK; Spring 1997.
The Future of Barcoding; Chain Store Age; Jan. 1997.
The Global Electronics Guidelines for Bar Code/2D Marking of Products & Packages in Conjunction with EDI; Jun. 22, 1996.
UPS; Guide to Bar Coding with UPS for Customers Generating Bar Code Labels, Version 1; Jun. 1, 1992.
UPS; UPS Guide to Labeling; 1999.
ANSI MH10/SC 8; Transfer Data Syntax for High Capacity ADC Media; Aug. 1998.
ANSI; Unit Loads and Transport Packages—Two-Dimensional Symbols; Jun. 15, 1996.
James Cambier et al.; Printable, Scannable Biometric Templates for Secure Documents and Materials; Optical Security and Counterfiet Deterrence Technique III; Proceedings of SPIE; Jan. 27-28, 2000.
UPS; Guide to Bar Coding with UPS for Customer Generating Bar Code Label, Version III.
United States Postal Service; Information-Based Indicia Program (IBIP) Performance Criteria for Information-Based Indicia and Security Architecture for Close IBI Postage Metering Systems (PCIBI-C); Jan. 12, 1999.
J.D. Tygar et al.; Crytpographic Postage Indicia; School of Computer Science, Carnegie Mellon University; Jan. 1996.
J.D. Tygar et al.; Cryptographic Postage Indicia; pp. 378-391 of Final Version in Concurrency and Parallelism, Programming, Networking, and Security; 1996.
J.D. Tygar et at; Cryptographic Postage Indicia; pp. 378-391 of in Concurrency and Parallelism, Programming, Networking, and Security; 1996.
United States Postal Service; Information-Based Indicia Program (IBIP) Performance Criteria for Information-Based Indicia and Security Architecture for Close IBI Postage Metering Systems (PCIBI-C); Feb. 23, 2000.
Jose Pastor; Cryptopost a Universal Information Based Franking System for Automated Mail Processing; pp. 429-442 of Advanced Technology Conference; Nov. 5-7, 1990.
Bennet Yee; Secure Coprocessor in Electronic Commerce Applications; pp. 155-170 of in Proceedings of the 1st USENIX Workshop on Electronic Commerce; Jul. 1995.
Bennet Yee; Using Secure Coprocessors; School of Computer Science, Carnegie Mellon University; May 1994.
EMA Foundation for Education and Research and United States Postal Service; Pursuing the Intelligent Document—Phase III, A Review of Technologies Impacting the Future of Mail; the Report of the Intelligent Document Task Force; Dec. 2001.
EMA Foundation for Education and Research; Pursuing the Intelligent Document, a Vision for Paper-Based Communications in the Information Age; the Report of the Intelligent Document Study Team; Mar. 1999.
National Postal Forum, Fall 1999; Forum Tracks; Sep. 26-29, 1999.
United States Postal Service; Delivery Confirmation Technical Guide; Feb. 1999.

\* cited by examiner

FIG. 4

SYSTEMS AND METHOD FOR PROVIDING INFORMATION TO A RECIPIENT OF A PHYSICAL MAIL OBJECT

CROSS-REFERENCE TO RELATED APPLICATION

This application is a continuation of U.S. patent application Ser. No. 13/560,306, filed Jul. 27, 2012, which is a continuation of U.S. patent application Ser. No. 13/297,515, filed Nov. 16, 2011, and issued on Sep. 4, 2012 as U.S. Pat. No. 8,260,629, which is a continuation of U.S. patent application Ser. No. 12/454,052, filed May 11, 2009, and issued on Dec. 6, 2011 as U.S. Pat. No. 8,073,787, which is a continuation of U.S. patent application Ser. No. 10/271,471, filed Oct. 15, 2002, and issued on Oct. 19, 2010 as U.S. Pat. No. 7,818,268, which claims the benefit pursuant to 35 U.S.C. §119(e) of U.S. Provisional Patent Application No. 60/330,031 filed Oct. 16, 2001, which applications are specifically incorporated herein, in their entirety, by reference.

BACKGROUND OF THE INVENTION

1. Field of the Invention

The present invention relates to mail verification, and more particularly to a system and method of authenticating at least one mail object by providing at least a portion of mail identification data over a wide area network, such as the Internet, in order to receive mail verification data.

2. Description of Related Art

Currently there are two ways to provided mail objects (e.g., letters, documents, packages, etc.) to an end user; that being electronically (e.g., email, etc.) and through traditional mail services (e.g., U.S. Postal Service, Federal Express, UPS, Courier, etc.). However, because certain mail objects cannot be delivered electronically (either because its impossible or impractical), they are delivered using traditional mail services.

There are several problems with delivering mail objects through traditional mail services. First, the mail object is typically secured inside packaging (e.g., envelops, boxes, etc.) before it is provided to the mail service. Thus, neither the mail service nor the recipient is aware of the contents of the package until such package is opened by the recipient. This creates a problem in that hazardous mail objects (i.e., Anthrax, explosives, etc.) are not detected until they are opened by the recipient, thus exposing the recipient to the hazardous material. It also creates a problem in that mail objects (in general) are not known until they are opened by the recipient, thus making it difficult for the recipient (or his designee) to properly screen, sort or avoid certain mail objects (e.g., offensive mail, annoying mail, etc).

Second, a manually delivered mail object is limited to a one-way production of a finite set of information and/or products. This becomes problematic when the sender of the mail object is interested in providing or receiving additional information (e.g., product instructions, warranty information, etc.). Finally, contents that can be delivered electronically (e.g., advertisements, software, etc.) are often included in mail objects that are delivered via traditional mail services. The drawback with this is that it increases the cost associated with producing and/or delivering the mail object and increase the size of the mail object. For at least these reasons, a need exists in the industry for a system and method of providing mail verification data in response to receiving mail ID data over a wide area network, such as the Internet.

SUMMARY OF THE INVENTION

The present invention provides a system and method for providing mail verification data over a wide area network, such as the Internet, in response to receiving and authenticating at least a portion of mail identification (ID) data. Preferred embodiments of the present invention operate in accordance with at least one reception device, a mail identification (ID) device, a memory, and a mail verification application adapted to communicate with the reception device over a wide area network, such as the Internet. Specifically, the mail verification application is adapted to store at least a verifying portion of mail ID data in memory. In one embodiment of the present invention, the verifying portion of the mail ID data includes an identifiable code portion (e.g., an alpha code, a numeric code, an alphanumeric code, a symbolic code, a digital code, etc.), a shipping portion (e.g., ship date, shipping location, shipping method, etc.) and/or a recipient portion (e.g., the recipients name, address, email address, IP address, account number, social security number, etc.). The mail ID data is then affixed to a mail object. The mail object, which may further include a mail-to-address, a return-mail-address, and/or postage, is then manually delivered to a recipient. In one embodiment of the present invention, the mail ID data further includes mail-to-address data, return-mail-address data, and/or postage data.

At least an authenticating portion of the mail ID data is then provided to the reception device. The reception device, which communicates with the mail ID device over a wide area network, transmits at least the authenticating portion of the mail ID data to the mail verification application operating on the mail ID device. The mail verification application then compares the authenticating portion of the mail ID data with the verifying portion stored in memory. If the authenticating portion corresponds to the verifying portion (e.g., matches, is reasonably related, etc.), then mail verification data is sent to the reception device. In one embodiment of the present invention, at least a portion of the mail verification data includes authenticating data (indicating that the mail ID data has been authenticated), securing data (indicating who secured the mail object), sender data (indicating who sent the mail object), recipient data (indicating the intended recipient of the mail object) and/or additional data (e.g., the contents of the mail object, downloadable product data, sender web-page information, third party advertisements, etc).

In one embodiment of the present invention, the mail ID device further includes an input device adapted to provide at least a verifying portion of the mail ID data to the mail verification application and/or an output device adapted to affix the mail ID data on the mail object. In another embodiment of the present invention, the reception device includes an input device for receiving at least an authenticating portion of the mail ID data from the mail object and/or a mail authenticating application adapted to receive at least the authenticating portion of the mail ID data from the input device and provide at least the authenticating portion of the mail ID data to the mail ID device. In another embodiment of the present invention, the U.S. Postal Service (or an interim authenticating or screening entity) is the recipient of the mail object, thus interacting with the reception device to receive mail verification data.

A more complete understanding of the system and method for providing mail verification data in response to receiving at least a portion of mail ID data will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a system and method for providing mail verification data over a wide area network, such as the Internet, in response to receiving and authenticating at least a portion of mail identification (ID) data. In the detailed description that follows, like element numerals are used to describe like elements illustrated in one or more figures.

Figure 1:
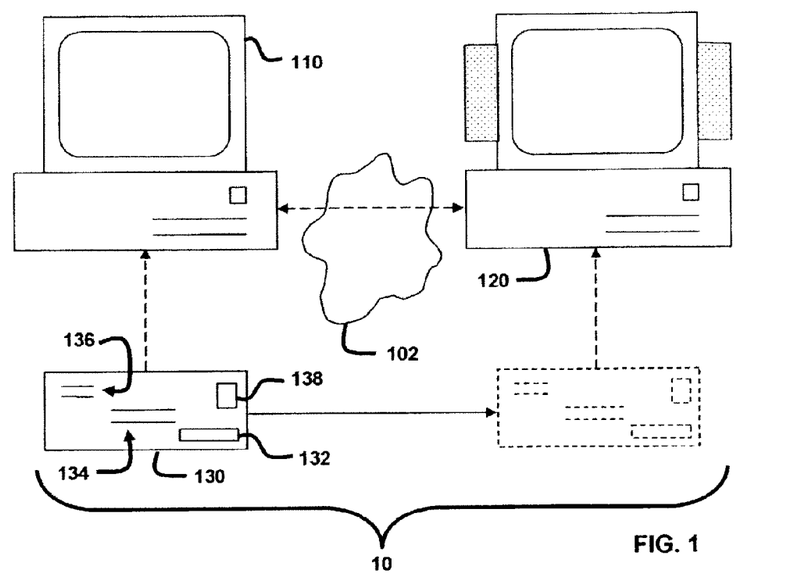
FIG. 1 illustrates one embodiment of the mail verification system.
Figure 2:
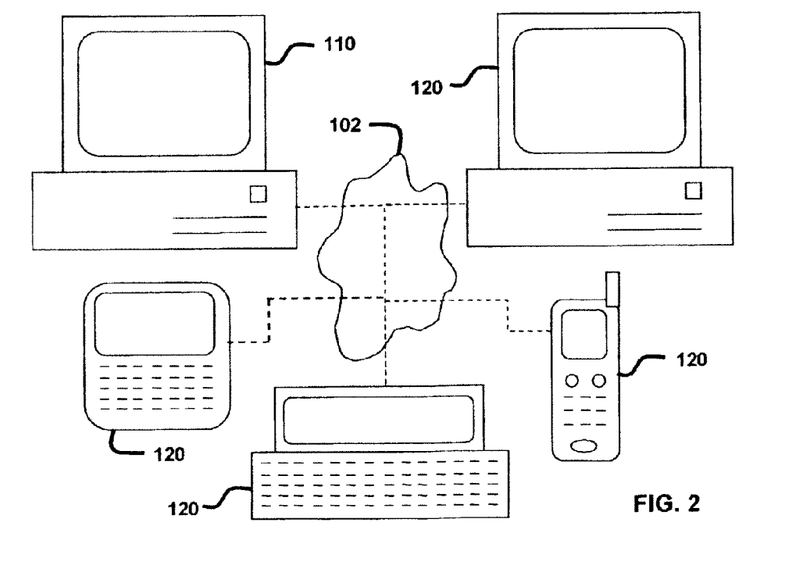
FIG. 2 illustrates a mail ID device communicating with a plurality of reception devices over a wide area network, such as the Internet.

Preferred embodiments of the present invention operate in accordance with at least one reception device, a mail identification (ID) device, a memory, and a mail verification application adapted to communicate with the reception device over a wide area network, such as the Internet. FIG. 1 illustrates one embodiment of the mail verification system 10, which includes a mail ID device 110 and a reception device 120 communicating through a wide area network 102, such as the Internet. It should be appreciate, as depicted in FIG. 2, that the reception device(s) 120 includes, but is not limited to, personal computers, set top boxes, personal digital assistances (PDAs), mobile phones, land-line phones, televisions, bar code readers, and all other physically and wirelessly connected reception devices generally known to those skilled in the art. It should further be appreciated that the number of reception devices 120 depicted in FIGS. 1 and 2 are merely to illustrate how the present invention operates, and are not intended to further limit the present invention.

Figure 3:
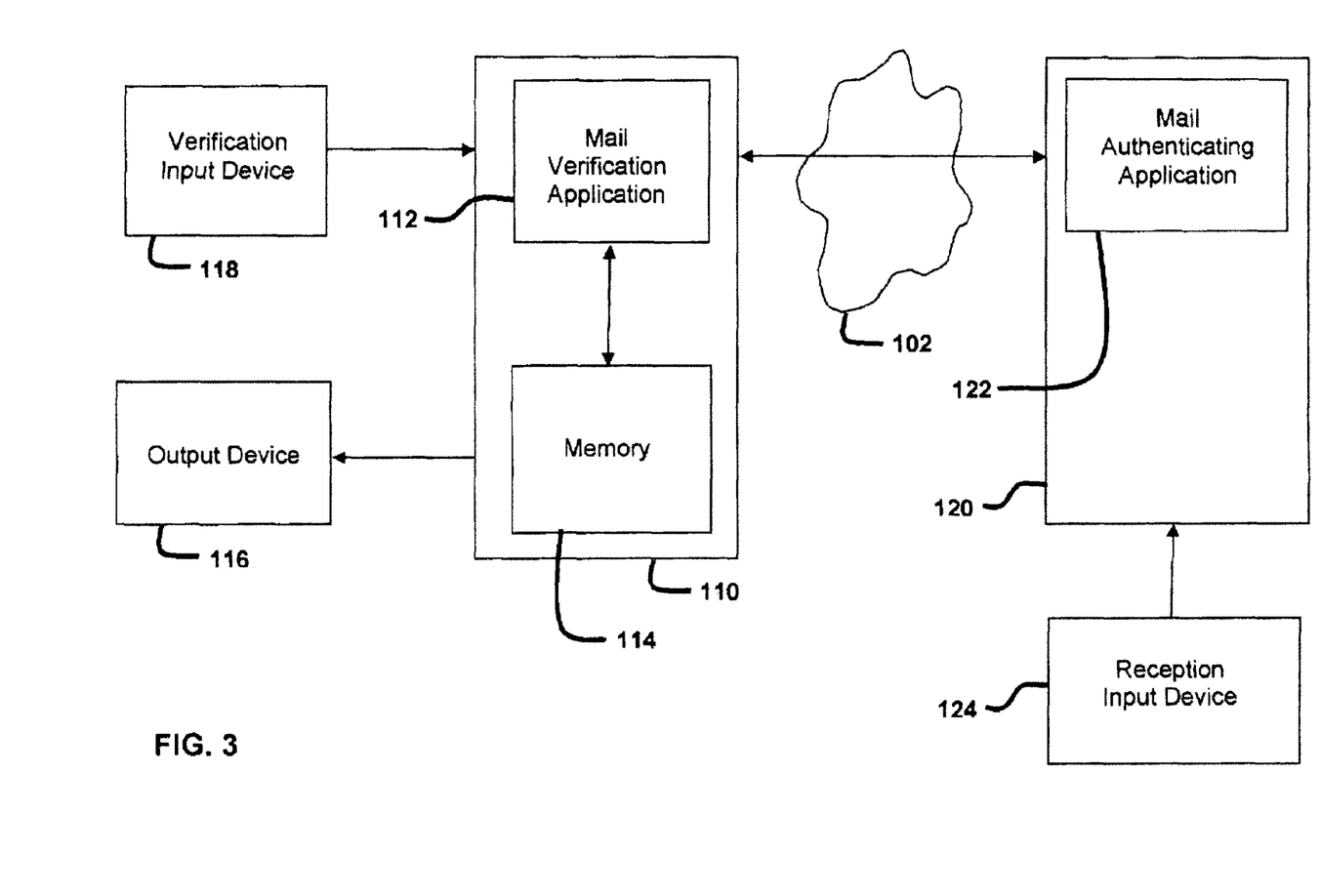
FIG. 3 illustrates one embodiment of the mail ID device and the reception device depicted in FIG. 1.

As shown in FIG. 3, the mail ID device 110 further includes a mail verification application 112 and a memory 114. The mail verification application 112 is adapted to store at least a portion (i.e., a verifying portion) of mail ID data in the memory 114, receive at least a portion (i.e., an authenticating portion) of mail ID data from the reception device 120, and provide mail verification data if the portion of the mail ID data received from the reception device 120 is authenticated. It should be appreciated that the mail verification application 112 may further be adapted to generate the mail ID data and provide it to an external device (e.g., a printer, etc.) or receive at least a verifying portion of the mail ID data from an external device (e.g., a scanner, etc.). It should also be appreciated that the mail verification application 112 may exist as a single application, or as multiple applications (locally and/or remotely stored) that operate together to perform the verification functions as described herein. It should further be appreciated that the location of the memory device 114 depicted in FIG. 3 is not intended to further limit the present invention. Thus, a memory device that is, for example, external to the mail ID device 110 is within the spirit and scope of the present invention.

Referring back to FIG. 1, where the dashed arrows indicate data transactions and the solid arrow indicates physical movement, mail ID data 132 is affixed to a mail object 130 (as used in its broader sense to include, but is not limited to, the packaging that surrounds the mail object). It should be appreciated that mail ID data can be encoded/encrypted (e.g., using bar code data, digital data, etc.) to prevent fraudulent usage. It should further be appreciated that affixing the mail ID data 132 on the mail object 130 includes, but is not limited to, printing or attaching mail ID data directly on the outer surface of the mail object 130 or printing/storing the mail ID data 132 on labels, ICs, smart cards, RFID tags, or any other data storage devices (or materials) generally known to those skilled in the art, and attaching them to the outer surface of the mail object 130. It should also be appreciated that the location of the mail ID data 132 on the mail object 130 in FIG. 1 is merely to exemplify how the invention operates, and is not intended to further limit the present invention. Thus, affixing the mail ID data 132 in some other location, such as over the sealing flap of an envelope, is within the spirit and scope of this invention.

At least a portion (i.e., a verifying portion) of the mail ID data 132 (either before or after the mail ID data is affixed) is stored in the mail ID device 110, or more particular (as shown in FIG. 3) in a memory 114 located within the mail ID device 110. Specifically, the mail verification application 112 either receives or generates at least the verifying portion of the mail ID data 132. The verifying portion is then stored in the memory 114. In one embodiment of the present invention, the verifying portion of the mail ID data includes a identifiable code portion (e.g., an alpha code, a numeric code, and alphanumeric code, a symbolic code, a digital code, etc.), a shipping portion (e.g., ship date, shipping location, shipping method, etc.), and/or a recipient portion (e.g., the recipients name, address, email address, IP address, account number, social security number, etc.). The mail object 130, which may further include a mail-to-address 134, a return-mail-address 136, and/or postage 138, can then be manually delivered to a recipient. It should be appreciated that the mail ID data 132 can also be encoded (e.g., in a bar code, etc.) to include mail-to-address data, return-mail-address data, and/or postage data. In other words, for example, mail ID data could be encoded to include both coded data and postage-account data.

Once the recipient (or their designee) receives the mail object 130, at least an authenticating portion of the mail ID data 132 is provided to the reception device 120. The reception device 120, which communicates with the mail ID device 110 over a wide area network 102, transmits at least the authenticating portion of the mail identification data to the mail verification application 112 operating on the mail ID device 110. The mail verification application 112 then compares the authenticating portion of the mail ID data with the verifying portion stored in memory 114. If the received portion is authenticated, or corresponds to the verifying portion (e.g., matches, is reasonably related, etc.), then mail verification data is sent to the reception device 120.

In one embodiment of the present invention, at least a portion of the mail verification data includes authenticating data (e.g., image data, audio data, etc.) indicating that the mail ID data has been authenticated. This would allow, for example, the reception device 120 to produce at least one authenticating image on a display and/or perform at least one authenticating sound on a speaker. In another embodiment of the present invention at least a portion of the mail verification data includes securing data (indicating who secured the mail object), sender data (indicating who sent the mail object), recipient data (indicating who is to receive the mail object) and/or additional data (e.g., the contents of the mail object, downloadable product data, sender web-page data, third party advertisements, etc).

In another embodiment of the present invention, the mail ID device and/or the reception device further include an input device (e.g., 118, 124) adapted to receive at least a portion of the mail ID data. It should be appreciated that that the input devices depicted and discussed herein (e.g., 118, 124) include, but are not limited to, scanners (e.g., bar code scanners, etc.), keyboards, RFID readers, smart card readers, IC readers, and all other input devices generally known to those skilled in the art.

In another embodiment of the present invention, the mail ID device further includes an output device 116 adapted to affix (e.g., print, store, etc.) the mail ID data on the mail object. It should be appreciated that affixing the mail ID data on the mail object includes, but is not limited to, printing or attaching mail ID data directly on the outer surface of the mail object or printing/storing the mail ID data on labels, ICs, smart cards, RFID tags, or any other data storage devices (or materials) generally known to those skilled in the art, and attaching them to the outer surface of the mail object. It should further be appreciated that the output device depicted and described herein (e.g., 116) includes, but is not limited to, printers, data storage device (e.g., device capable of storing data on ICs, smart cards, RFID tags, etc.), and all other output devices generally known to those skilled in the art.

In another embodiment of the present invention, as shown in FIG. 3, the reception device 120 further includes a mail authenticating application 122 adapted to receive at least the authenticating portion of the mail ID data from the input device 124 and provide at least the authenticating portion of the mail ID data to the mail ID device. It should be appreciated that the mail authenticating application 122 may exist as a single application, or as multiple applications (locally and/or remotely stored) that operate together to perform the authenticating functions as described herein.

In one embodiment of the present invention, the mail ID data further includes software-booting data adapted to boot the mail authenticating application, an email application and/or a browser application. Either one of these applications could then be used to provide at least an authenticating portion of said mail ID data to said mail ID device, provide additional information to said mail ID device (or the sender of the mail object), and/or receive additional information from either the mail ID device, the sender of the mail object, or a third-party. In another embodiment, the mail verification data further includes software-booting data adapted to boot an email application and/or a browser application. Either one of these applications could then be used to provide additional information to the mail ID device and/or receive additional information from either the mail ID device, the sender of the mail object, or a third party.

In another embodiment of the invention, the reception device 120, or more particularly the mail authenticating application 122 is adapted to provide a reply email to the mail ID device 130 or the sender of the mail object. This reply email may either be sent automatically, to acknowledge the reception of the mail ID data and/or mail verification data, or manually, to allow the recipient to communicate with the mail ID device and/or sender of the mail object. In another embodiment of the invention the mail verification application 112 is adapted to provide the mail verification data to the reception device 120 via an email.

In another embodiment of the present invention, the U.S. Postal Service (or an interim authenticating or screening entity) is the recipient (as defined by this application) of the mail object 130, thus interacting with the reception device 120 to receive mail verification data. If mail is authenticated (or approved in the case of screening), the mail object 130 is forwarded on to the actual intended recipient.

Figure 4:
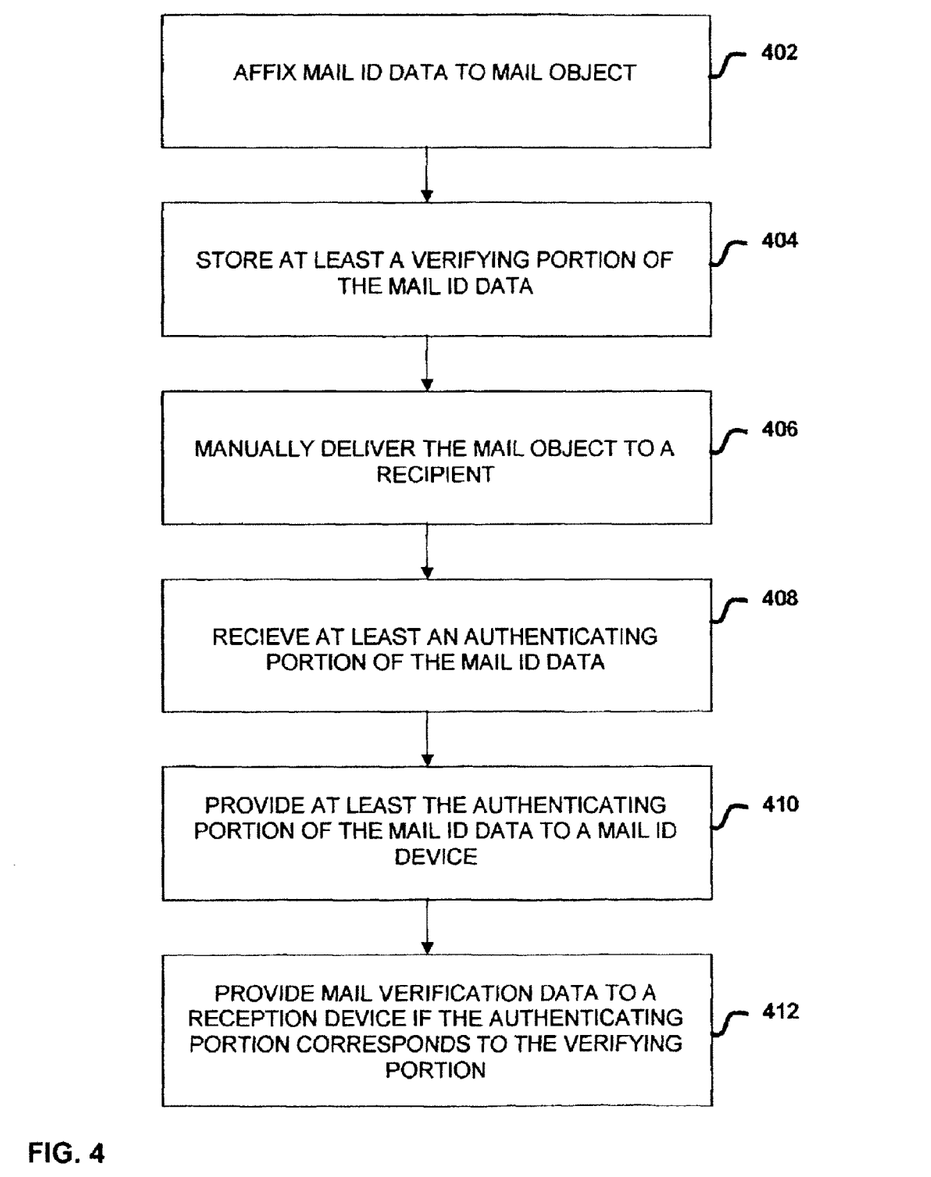
FIG. 4 is a flow chart illustrating one method of providing mail verification data in response to receiving at least a portion of mail ID data.

FIG. 4 is a flow chart illustrating one method of providing mail verification data in response to receiving at least a portion of the mail ID data. Specifically, in step 402 mail ID data is affixed to a mail object. At step 404, a verifying portion of the mail ID data is stored in a memory device. The mail object is then delivered to its recipient (or designee) at step 406. At step 408, a reception device receives at least an authenticating portion of the mail ID data. The reception device then provides at least the authenticating portion to a mail ID device at step 410. If the authenticating portion of the mail ID data corresponds to the verifying portion of the mail ID data, then mail verification data is provided to the reception device at step 412. It should be appreciated that storing the verifying portion of the mail ID data before the mail ID data is affixed to the mail object is within the spirit and scope of the present invention.

Having thus described multiple embodiments of a system and method of providing mail verification data in response to receiving mail ID data, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A method for providing electronic data to a recipient of a mail object, comprising:
   using an output device to affix a single set of mail ID data to said mail object, said single set of mail ID data including at least recipient data, said recipient data comprising a personalized network address associated with said recipient of said mail object;
   submitting said mail object to a mail carrier for delivery to said recipient of said mail object;
   receiving said recipient data from a reception device of said recipient via a network; and
   providing by at least one processor said electronic data to said reception device via said network in response to receiving said recipient data, said electronic data including data on a content of said mail object;
   wherein said reception device displays said electronic data to a recipient of said mail object by displaying said electronic data on a screen of said reception device.

2. The method of claim 1, further comprising providing by said at least one processor a second set of electronic data to a sender of said mail object.

3. The method of claim 2, wherein said step of providing said second set of electronic data to said sender of said mail object is performed after said step of receiving said first set of mail data.

4. The method of claim 3, wherein said second set of electronic data includes at least a portion of said recipient data.

5. The method of claim 3, wherein said second set of electronic data includes data corresponding to said reception device.

6. The method of claim 3, wherein said second set of electronic data includes data corresponding to said mail object.

7. The method of claim 1, wherein said step of affixing said single set of mail ID data to said mail object, further comprises encoding said single set of mail ID data prior to being affixed to said mail object.

8. The method of claim 1, wherein said step of receiving said recipient data from said reception device further comprises receiving at substantially the same time additional data from said reception device.

9. The method of claim 1, wherein said step of receiving said recipient data from said reception device further comprising receiving at substantially the same time additional data from and related to said reception device.

10. The method of claim 1, wherein said reception device is a cellular telephone.

11. A system for providing electronic data to a recipient of a mail object, said mail object including a single set of mail ID data that includes at least recipient data, comprising:
at least one database for storing at least a first set of electronic data;
a mail device; and
at least one application operating on at least said mail device, said at least one application being in communication with said database and a reception device of said recipient having at least an input device and a display, and being configured to:
generate said single set of mail ID data;
receive said recipient data from said reception device, said recipient data including personalized data that can be used to identify said recipient of said physical mail object; and
provide said first set of electronic data to said reception device via said network in response to receiving said recipient data, said first set, of electronic data including data on a content of said mail object;
wherein receiving said first set of mail data from said reception device results in a second set of electronic data being provided to a sender of said mail object.

12. The system of claim 11, wherein said at least one application is further configured to encode said single set of mail ID data and to affix to said single set of encoded data on said mail object.

13. The system of claim 11, wherein said at least one application is further configured to provide said first set of electronic data to said reception device via a web page.

14. The system of claim 11, wherein said at east one application is further configured to provide said first set of electronic data to said reception device via an email.

15. The system of claim 11, wherein said at least one application is further configured to generate an email addressed to the recipient in response to receiving said recipient data.

16. The system of claim 11, wherein said second set of electronic data includes at least a portion of said recipient data.

17. The system of claim 11, wherein said second set of electronic data includes data corresponding to said recipient of said mail object.

18. The system of claim 17, wherein said at least one application is further configured to provide said second set of electronic data to said sender via a web page.

19. The system of claim 11, wherein said second set of electronic data includes data corresponding to said reception device.

20. The system of claim 11, wherein said recipient data includes at least a personalized network location associated with said recipient of said mail object.

21. A system for providing electronic data to a recipient of a mail object, said mail object including a single set of mail ID data that includes at least recipient data, wherein said recipient data corresponds to said recipient of said mail object, comprising:
a processor;
at least one database for storing at least said electronic data; and
at least one application operating on at least said processor, configured to:
affix the single set of mail ID data to said mail object, said mail object being submitted to a mail carrier for delivery to said recipient of said mail object;
at least one other application in communication with at least a reception device of said recipient having at least one input device for receiving said recipient data from said mail object, said at least one other application being configured to:
receive said recipient data from said reception device; and
provide said first set of electronic data to said reception device via a network in response to receiving said recipient data, said electronic data including data corresponding to a content of said mail object;
wherein receiving said recipient data results in a second set of electronic data being provided to a sender of said mail object.

22. The system of claim 21, wherein said recipient data includes at least a personalized network location associated with said recipient of said mail object.

23. The system of claim 22, wherein said at least one other application is further configured to provide said first set of electronic data to said reception device via a web page.

24. The system of claim 22, wherein said at least one other application is further configured to provide said first set of electronic data to said reception device via an email.

25. The system of claim 22, wherein said reception device is a cellular telephone.

26. The system of claim 21, wherein said second set of electronic data includes at least a portion of said first of mail data.

27. The system of claim 21, wherein said second set of electronic data includes data corresponding to, said recipient of said mail object.

28. The system of claim 21, wherein said second set of electronic data includes data corresponding to said reception device.

29. The system of claim 21, wherein said recipient data includes at least a personalized network location associated with said recipient of said mail object.

30. The system of claim 21, wherein said single set of mail ID data is encoded before it is affixed to said mail object.

* * * * *